United States Patent [19]

Miyazaki et al.

[11] Patent Number: 4,594,301

[45] Date of Patent: Jun. 10, 1986

[54] LEAD-ACCUMULATOR AND ACTIVE MATERIALS USED THEREIN

[75] Inventors: Kazuhide Miyazaki; Morimasa Sumida, both of Takehara, Japan

[73] Assignee: Mitsui Mining and Smelting Co., Ltd., Tokyo, Japan

[21] Appl. No.: 742,146

[22] Filed: Jun. 7, 1985

Related U.S. Application Data

[63] Continuation of Ser. No. 592,415, Mar. 23, 1984, abandoned.

[30] Foreign Application Priority Data

Jun. 15, 1983 [JP] Japan .................................. 58-105782

[51] Int. Cl.$^4$ .............................................. H01M 4/56
[52] U.S. Cl. ...................................... 429/228; 423/619
[58] Field of Search ........................ 429/228, 225–227; 423/619, 618; 106/286.1, 286.4, 286.8, 287.19, 288 B, 297

[56] References Cited

U.S. PATENT DOCUMENTS 4,158,723  6/1979  Gabano et al. .................. 429/228 X

OTHER PUBLICATIONS

Chang et al, "Evaluation of Battery Oxides", Progress Report, No. 9, Dec. 1, 1980 to Jun. 15, 1981.

Primary Examiner—Charles F. LeFevour
Attorney, Agent, or Firm—Burns, Doane, Swecker and Mathis

[57] ABSTRACT

An active material for the positive electrode of a lead-accumulator and a lead-accumulator utilizing the active material are provided, the active material consisting of lead oxide as the principal component and at least one component selected from the group consisting of bismuth, bismuth compounds, thallium and thallium compounds as an additive which is effective to improve the energy utilization and the lifetime of the accumulator.

17 Claims, 3 Drawing Figures

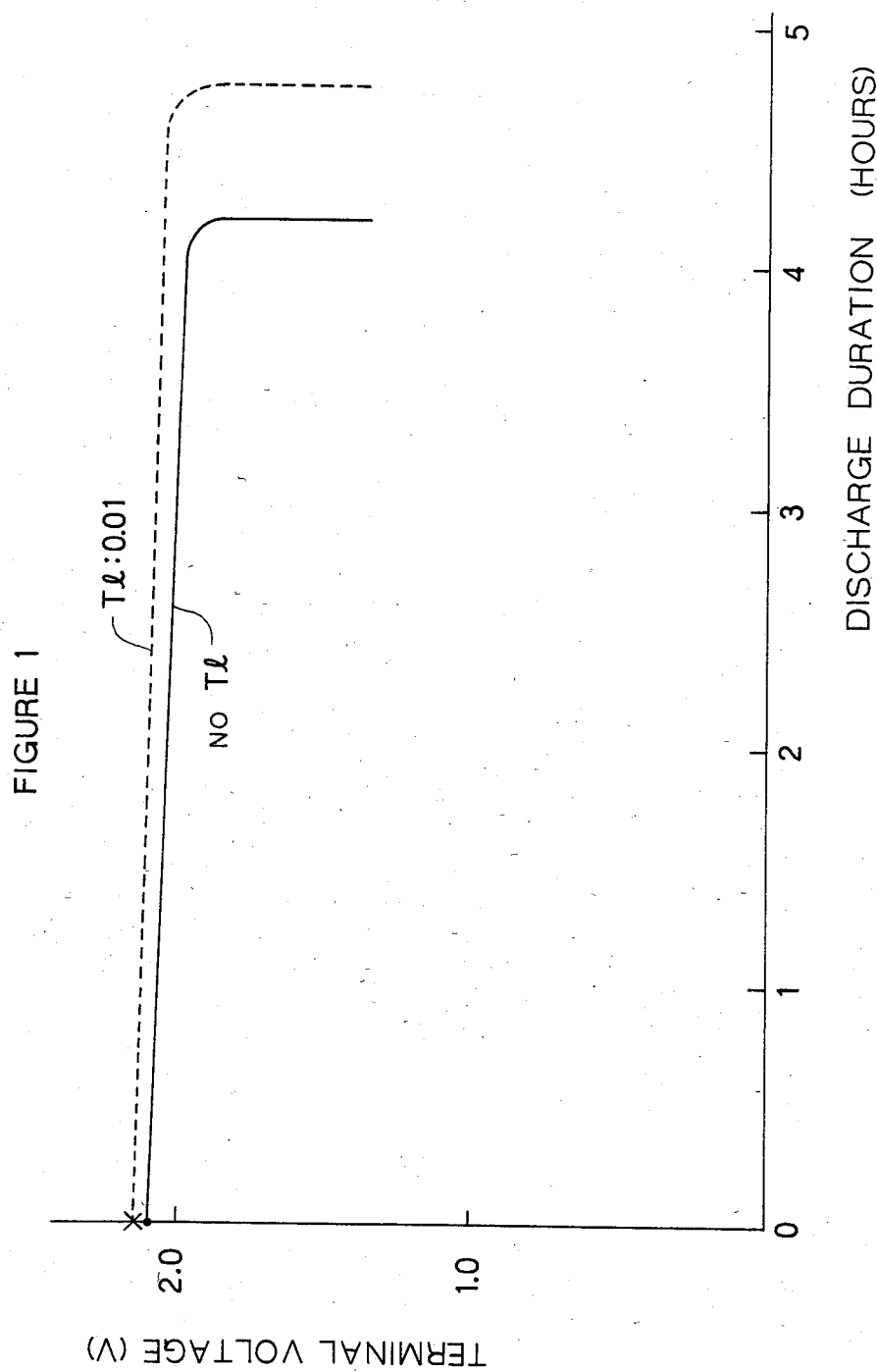

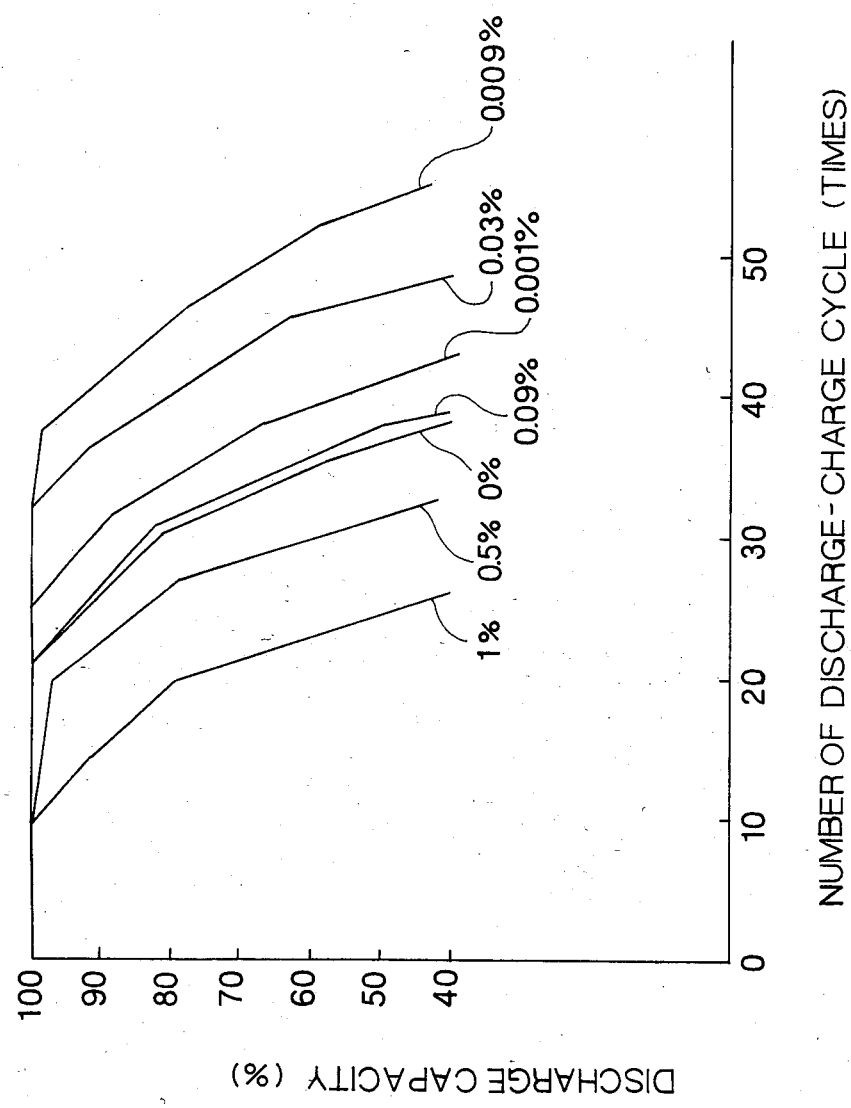

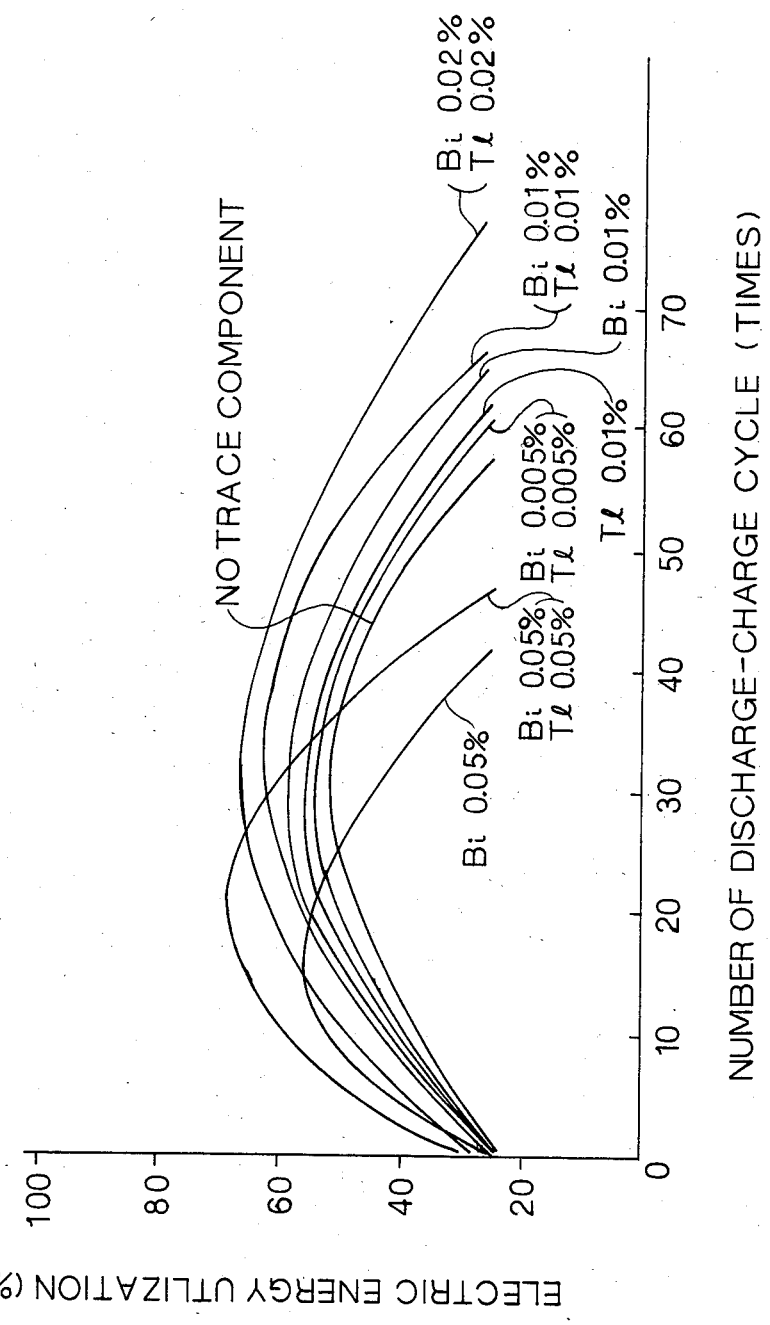

LEAD-ACCUMULATOR AND ACTIVE MATERIALS USED THEREIN

This application is a continuation of application Ser. No. 592,415, filed Mar. 23, 1984 now abandoned.

FIELD OF THE INVENTION

The present invention relates to an improved active material for the positive electrode of a lead-accumulator and a lead-accumulator per se in which the active material is utilized.

DESCRIPTION OF THE PRIOR ART

In an accumulator, active materials used for the positive electrode play an important role in accumulating electric energy and in discharging the same.

It is well known that the accumulation of electric energy is accomplished by a charging operation during which an active material deposited on a positive plate of the accumulator is converted into electrically active lead oxide ($PbO_2$) and simultaneously an active material for the negative electrode is converted into metallic lead (Pb) and that the discharge of electric energy results from the conversion of $PbO_2$ into electrically inactive lead sulfate ($PbSO_4$) and the simultaneous conversion of the metallic lead, of the active material for the negative electrode, into lead sulfate ($PbSO_4$) during the discharging operation.

These reactions can be expressed as follows:

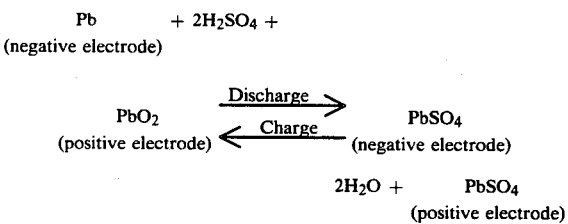

Up to now, it has been known that the active material for the positive electrode contains lead oxide as the principal component. For example, an oxide of net lead kneaded into the form of paste is used as the active material.

However, with a lead-accumulator using such an active material, it is usual that the energy utilization of the accumulator is only 50% or so with respect to the theoretical value thereof.

In addition, there is a strong need for reducing the size and the weight of the lead-accumulator in this art, since present accumulators are generally large in size and heavy in weight. However, such size reduction and weight reduction should not impair the quality of the accumulator.

It is further desirable to improve the discharge capacity of the lead-accumulator without changing the size and weight thereof.

Thus, it is desirable to develop an active material which permits a reduction in the amount of the material required to be used in the lead-accumulator and which makes it possible to increase the capacity thereof.

SUMMARY OF THE INVENTION

Under such circumstances, the inventors of the present invention made an exhaustive study toward realizing a new active material for the lead-accumulator and as a result they developed an improved active material for the lead-accumulator by incorporating small amounts of substances such as bismuth, thallium, or compounds thereof into lead-oxide as the principal ingredient.

The purpose of the present invention is to provide a new active material for the lead-accumulator which makes it possible to reduce the amount of active material required to be used in the accumulator and which simultaneously improves the discharge capacity of the accumulator.

Another purpose of this invention is to provide a lead-accumulator in which the active material according to this invention is deposited on the positive electrode thereof.

These and other objects and features of the present invention will be more apparent from the following detailed description.

BRIEF DESCRIPTION OF THE DRAWINGS

FIG. 1 shows typical discharge curves of the accumulator obtained in Example 2 set forth later in this specification, wherein the thallium content in the active material is 0.01 wt%;

FIG. 2 is a graph showing that the discharge capacity of the accumulator varies depending on the thallium content of the active material; and FIG. 3 is a graph showing that the electric energy utilization of the lead-accumulator varies in proportion to the content of the additive in the active material.

DETAILED DESCRIPTION OF THE INVENTION

The active material for a lead-accumulator according to the present invention consists of lead oxide as the principal component and at least one member selected from the group consisting of bismuth, bismuth compounds, thallium and thallium compounds as additive.

In the invention, what is commonly called "powdered lead" consisting of 70 to 90% lead oxide and the balance (30 to 10%) of metallic lead is generally used as the principal component. However, other compounds such as lead monoxide (PbO), red lead ($Pb_3O_4$), lead suboxide ($Pb_2O$), lead peroxide ($PbO_2$) or the like may also be employed in the invention and the same effect as "powdered lead" may be expected.

The amount of bismuth or a bismuth compound added to the active material is in the range of 0.001 to 0.03%, preferably 0.005 to 0.02% by weight of the active material, expressed as net bismuth. This is particularly critical for improvement of the electric energy utilization of an accumulator wherein the positive plate is coated with said active material.

As the bismuth compounds which may be used in the present invention, there can be mentioned such bismuth oxides as for example, bismuth (III) oxide and bismuth (V) oxide, as well as bismuth sulfate.

In the active material for lead-accumulator according to the present invention, it is also possible to use thallium or a compound thereof as the additive. In such case the amount used is up to 0.1%, preferably 0.005 to 0.05%, by weight of the active material, expressed as net thallium. If the amount of thallium exceeds 0.1 wt%, it tends to cause a reduction in the electric energy utilization.

As the thallium compounds usable in the present invention, there can be mentioned, for example, thallium (I) oxide, thallium (III) oxide and thallium sulfate.

According to the present invention, the active material for the accumulator may further include both bismuth or a bismuth compound and thallium or a thallium compound simultaneously and the amount of these should fall within the range of 0.001 to 0.03%, preferably 0.005 to 0.02% by weight of the active material, expressed as net elements. If the amount of these additives used are outside this range, the desired effects of this invention cannot be obtained.

In this connection, better effect can be obtained in the case where the two kinds of additives are used as additives than in the case where one additive is independently used.

The active material of the present invention may be prepared according to various processes. For instance, one usable process comprises mixing the principal component and the additive(s) and pulverizing the mixture by a conventional method such as ball milling to form a powdered active material. Another process comprises adding powdered additive(s) to the powdered principal component and mixing them sufficiently. Furthermore, it is possible to use aqueous solutions of the components.

The present invention further provides an accumulator provided with a positive plate on which the active material of the invention is deposited.

The accumulator may, for instance, be assembled according to the following manner.

The active material formed by the process as described above is firstly mixed with a small amount of dilute sulfuric acid or water for kneading, to form a pasty material and then the paste is spread into a positive plate, usually in the form of grid by a conventional coating means. The grid (positive plate) plays two roles i.e., as a supporter for the active material as well as a conductor, and is usually constructed from lead alloy such as lead-antimony. The positive plate coated with the active material is then dried and aged according to a number of known processes.

The positive plate thus obtained is held between separators which may be prepared from a thermoplastic synthetic resin such as polyvinyl chloride, polystyrene, polyethylene, polypropylene; porous synthetic resin plate; glass wool or other fiber material, etc.

The positive plate thus formed and conventional negative plates are alternately arranged and introduced into a battery container to form a lead-accumulator.

At this stage, each elementary cell is subjected to a formation process comprising applying an electric current of 0.2 to 0.5 A for a specified time after pouring dilute sulfuric acid (the specific gravity of which is commonly in the range of 1.05 to 1.15) in the battery container. However, the formation process need not be carried out at this stage. It is also possible to carry out the process before the accumulator is assembled.

Then, the specific gravity of the electrolyte solution is adjusted to about 1.28 (at 20° C.) to complete the accumulator.

The process for assembling the accumulator of this invention described above is only a typical one and the accumulator may be made according to any one of various conventional methods.

The quality of a lead-accumulator formed may be evaluated from various physical or chemical properties such as electric energy utilization, cumulative discharge time, etc. "Electric energy utilization" is herein defined as the ratio of the electric capacity (expressed as A/H) practically utilized to the theoretical capacity of the active material deposited on the positive electrode during each discharge process when the completed accumulator is subjected to repeated discharge (to a final discharge voltage of 1.7 V)-charge cycles.

The active material according to the present invention makes it possible to improve the electric energy utilization and the cumulative discharge time of the accumulator wherein the active material of this invention is deposited on the positive electrode thereof. This is due to the addition of a small amount of additive such as bismuth, a bismuth compound, thallium or a thallium compound or a mixture thereof.

Now, the present invention will be explained more concretely referring to the following examples which are described with reference to the attached drawings.

EXAMPLE 1

To 16 g of PbO powder (passable through a 200 mesh sieve; purity 99.8%), which was produced by oxidation roasting of the usual ball milled powdered lead, was added 0.0048 g (0.03 wt%) of thallium oxide and these ingredients were sufficiently admixed with each other by using a mortar and a pestle of agate. After adding 1.4 ml of net water drop by drop to the mixture and kneading it, an aliquot of 2.3 ml of dilute sulfuric acid (specific gravity 1.2) was added drop by drop, then the mixture was sufficiently kneaded to obtain an active material for lead-accumulator in the form of paste.

The active material thus prepared was coated on a grid-like positive plate (45×58 mm) of a lead alloy (antimony content: 3.2 wt%) and the plate coated was aged in an atmosphere of high temperature and humidity for 24 hours. Then, the plate was dried by heating it to 45° to 50° C. for 6 hours to obtain a positive plate "A" to be tested. The plate "A" was held between an usual glass mat and a separator and the assembled plate was introduced into a battery container together with a conventional negative plate to form a lead-accumulator "A". After the addition of dilute sulfuric acid (specific gravity 1.1), the formation of lead-accumulator was carried out by passing an electric current of 0.2 A for 48 hours. Discharge (a constant current of 0.4 A)—charge (a constant current of 0.2 A) cycles of the accumulator were repeated after the completion of the formation.

For comparison, an active material was further prepared according to the same procedure as described above except that no thallium oxide was added. Then, using the resulting active material, a positive plate "B" and a lead-accumulator "B" were prepared in the same way as described before. Th accumulator was subjected to the same cell test at the same time.

The results obtained are shown in the following Table I.

TABLE I

| Number of Discharge-Charge Cycles | Discharge Duration | |
|---|---|---|
| | Accumulator A | Accumulator B |
| 5 | 3 hr 50 min | 2 hr 20 min |
| 10 | 4 hr 30 min | 3 hr 40 min |
| 15 | 4 hr 35 min | 4 hr 0 min |
| 20 | 4 hr 10 min | 3 hr 50 min |
| 25 | 4 hr 10 min | 3 hr 50 min |
| 30 | 3 hr 55 min | 3 hr 40 min |

The accumulator "A" containing thallium oxide ($Tl_2O_3$) according to the invention has a very long discharge duration compared with the accumulator "B" free from thallium oxide. The discharge current of 0.4 A is referred to as 5 hour-discharge rate and is equal to double of the discharge current usually employed. It is seen that, under such a severe discharge condition, the accumulator "A" according to the invention was superior in the cell reaction to the comparative one (accumulator B).

EXAMPLE 2

150 g of lead acetate trihydrate was dissolved in 500 ml of net water in a 1 liter-beaker with warming and 10 ml of a $Tl(NO_3)_3$ solution was added to the lead acetate solution in an amount equivalent to 10 mg net thallium and stirred. The resulting solution was neutralized by the dropwise addition of 100 g/l NaOH solution to obtain an admixed precipitate of lead hydroxide and thallium hydroxide ($Tl(OH)_3$) and the product was referred to as sample "C". The end point of the reaction was at the pH of 11.5. No heat treatment during the reaction was necessary.

As a comparative sample, lead hydroxide was prepared according to the same procedure as described above except for the addition of thallium and this was referred to as sample "D".

The resulting precipitates were filtered off, washed and dried according to a conventional manner. The dried samples were heated to 250° C. for 8 hours. Analysis showed that the sample "C" includes 0.01% of thallium.

Then, two accumulators "C" and "D" were prepared by using the samples "C" and "D" respectively according to the procedures disclosed in Example 1 and these accumulators were subjected to repeated discharge (a constant current of 0.4 A)—charge (a constant current of 0.2 A; 15 hours) cycles to compare the discharge duration. The results are shown in FIG. 1.

In FIG. 1, the discharge duration (hours) is shown on the abscissa and the terminal voltage (V) on the ordinate. The broken line shows the result of the accumulator of this invention and the solid line shows that of the comparative one.

According to the results shown in FIG. 1, it is clear that the discharge duration of the accumulator of this invention is longer than that of the comparative one which is free from thallium and that the terminal voltage of the former is higher than that of the latter.

EXAMPLE 3

To the lead monoxide (PbO) used in Example 1, were added 0.001, 0.0096, 0.03, 0.09, 0.5 and 1.0 wt% of thallium oxide ($Tl_2O_3$) (expressed as net thallium) to form a series of positive plates. A positive plate free from thallium was also prepared. Then, accumulators were assembled by using the resulting plates, according to the procedure of the preceding examples and these were subjected to repeated discharge—charge cycles to compare the discharge capacity of these sample accumulators with each other.

The results are shown in FIG. 2. In FIG. 2, the number of discharge—charge cycles (times) is taken on the abscissa and the discharge capacity (%) is taken on the ordinate. The numerical values expressed in percentage indicate the thallium contents of the respective sample.

The results in FIG. 2 show that if the amount of added thallium is higher than 0.1%, the effect of the invention may not be attainable.

EXAMPLE 4

To 16 g of powdered lead prepared by the usual ball milling was added 0.01 wt% of bismuth oxide ($Bi_2O_3$) (expressed as net bismuth) and these components were throughly mixed using a mortar and pestle of agate. 2.3 ml of dilute sulfuric acid (spicific gravity: 1.2) and 1.5 ml of net water were added to the mixture and the mixture was thoroughly kneaded for 15 to 20 minutes to form a pasty material. The resulting pasty material was coated on a positive plate of a lead alloy (containing 2.5 wt% of antimony), in the form of a grid (45×58 mm), and thereafter the coated plate was aged in an atmosphere of high humidity and temperature (80° to 90° C.) for 20 hours. The positive plate thus formed was held between a glass mat and a separator and then the resulting positive plate assembled was introduced into a plastic battery container together with a conventional negative plate to form an elementary cell. After the addition of dilute sulfuric acid (specific gravity: 1.1) to the battery container, the formation of a lead accumulator was carried out by the application of an electric current of 0.2 A for 40 hours. Then, the specific gravity of the electrolyte was adjusted to 1.28 (at 20° C.) after the termination of the formation. This was referred to as accumulator "E".

A comparative accumulator "F" was prepared according to the same procedure as described above except that the active material for the positive electrode was free from bismuth oxide.

These accumulators were tested by subjecting them to repeated discharge (a constant current of 0.4 A)—charge (a constant current of 0.2 A) cycles. The cumulative discharge times over 40 discharge-charge cycles were as listed in Table II below. The final discharge voltage was set at 1.7 V.

TABLE II

|  | Cumulative Discharge time |
|---|---|
| Accumulator E | 133 hours and 54 minutes |
| Accumulator F | 128 hours |

It can be seen from the foregoing results that the discharge time of the accumulator "E" according to the present invention was much longer than that of the comparative accumulator "F", meaning that the accumulator "E" is superior in quality to the accumulator "F".

EXAMPLE 5

In this example, 16 g of powdered lead obtained by ball milling was used as the lead component and 0.01% by weight of bismuth oxide ($Bi_2O_3$), expressed as net bismuth and 0.01% by weight of thallium (III) oxide based on net thallium were used as additives. According to the same procedure as described in Example 4, an accumulator "G" was prepared from the ingredients mentioned above, and then subjected to the test disclosed in Example 4. The cumulative discharge time of this accumulator "G" over 40 discharge—charge cycles is shown in Table III together with the result for the comparative accumulator "F".

TABLE III

|  | Cumulative discharge time |
|---|---|
| Accumulator G | 134 hours and 10 minutes |
| Accumulator F | 128 hours |

The results show that the accumulator "G" having both bismuth oxide ($Bi_2O_3$) and thallium (III) oxide ($Tl_2O_3$) as components of the active material of its positive electrode, is superior in discharge time to the comparative accumulator "F".

EXAMPLE 6

According to the method for constructing an accumulator as set forth in Example 4, a series of elementary cells were assembled so as to differ from each other in the bismuth or thallium content in the active material used.

These elementary cells were subjected to a test wherein discharge—charge cycles were repeatedly conducted. In each discharge process, the final discharge voltage was set at 1.7 V. Then, the electric energy utilization was estimated on the basis of the discharge capacity of each elementary cell and theoretical electric capacity of the active material deposited on the positive electrode, which varies depending on the amount thereof deposited. The electric energy utilization was defined as the ratio of the electric capacity which can be utilized during each discharge stage to the theoretical electric capacity. The results calculated were plotted in the attached FIG. 3.

From the results shown in FIG. 3, it is found that a higher energy utilization is attained in the case where the active material includes both bismuth and thallium components than in the case where the active material includes only one or the other. However, if the added amount of one or both of these reaches 0.05 wt% expressed as net element, the energy utilization is quite high at the initial stage but quickly decreases with the increace in the number of discharge—charge cycle. Therefore, it is more preferable to limit the ratio Bi/Tl to about 1:1 and to restrict the upper limit for the content of the additive(s) to about 0.02 wt%.

EXAMPLE 7

Net lead (purity 99.99%) was melted and bismuth and thallium metals (0.01 wt% of each) were added to and melted together with said molten lead under stirring to form a homogeneous alloy. The resulting molten metal was poured into a mold in the form of a cylinder (25 mm in diameter, 25 mm in height) to form a bulk lead alloy. Here it should be noted that each of the additives was previously incorporated into a base alloy in which 5% of the element was included. Each base alloy was prepared according to the conventional method of adding the element to molten lead and stirring. The cylindrical mold preferably has a somewhat conical profile in some degree so that the solidified lead alloy can be easily removed from the mold.

Then, so called powdered lead was obtained by introducing the lead alloy thus formed into a porcelain ball mill (250 mm in diameter and 250 mm in length) and rotating the mill at about 150 to 200 rpm to pulverize the balls of the lead alloy. Ordinarily in this type of milling process, the amount of the lead to be introduced is desirably about 5 Kg. The milling time is usually 15 to 20 hours, whereby powdered lead may readily be obtained. The resulting powdered lead sometimes includes small amounts of particulate metallic lead having a particle size of several mm. In such case, the powdered lead must be passed through a 100 mesh sieve to remove them.

An accumulator "H" using the ball milled lead powder was assembled according to the process as set forth in Example 5 and subjected to the cell test described in Example 4, whereby the cumulative discharge time over 400 discharge—charge cycles was determined. The result is shown in Table IV together with the result for the comparative accumulator "F".

TABLE IV

|  | Cumulative Discharge time |
| --- | --- |
| Accumulator H | 134 hours and 30 minutes |
| Accumulator F | 128 hours |

It is found from the results of this example that an excellent result is attained even when metal bismuth and thallium are used as additive.

What is claimed is:

1. An active material for a lead-accumulator which consists of lead oxide as the principal component and at least one member selected from the group consisting of bismuth, bismuth compounds, thallium and thallium compounds as an additive, wherein the amount of bismuth or a bismuth compound is in the range of 0.001 to 0.03 wt % of the active material, expressed as net bismuth, the amount of thallium or thallium compound is up to 0.1 wt % of the active material, expressed as net thallium and the amount of both bismuth or a bismuth compound and thallium or a thallium compound is in the range of 0.001 to 0.03 wt % of the active material, expressed as net elements, the additive being incorporated in the lead oxide by preparing a bulk lead alloy which includes the addtive, and pulverizing the alloy, or by mixing a solution of a lead compound with a solution of the additive, and neutralizing the mixture of solutions to form precipitates.

2. An active material as set forth in claim 1 wherein the additive is thallium or a thallium compound.

3. An active material as set forth in claim 2 wherein the thallium compound is thallium (I) oxide, thallium (III) oxide or thallium sulfate.

4. An active material as set forth in claim 3 wherein the amount of thallium or a thallium compound is in the range of 0.005 to 0.05 wt%, expressed as net thallium.

5. An active material as set forth in claim 1 wherein the additive is bismuth or a bismuth compound.

6. An active material as set forth in claim 5 wherein the bismuth compound is a bismuth oxide or bismuth sulfate.

7. An active material as set forth in claim 6 wherein the amount of bismuth or a bismuth compound is in the range of 0.005 to 0.02 wt%.

8. An active material as set forth in claim 1 wherein the active material contains both bismuth or a bismuth compound and thallium or a thallium compound as additives.

9. An active material as set forth in claim 8 wherein the amount of the additives is in the range of 0.005 to 0.02% by weight of the active material, expressed as net elements.

10. An active material as set forth in claim 9 wherein the ratio Bi/Tl is approximately 1:1.

11. A lead-accumulator which comprises a battery container, positive electrodes in the form of grids, on which is deposited an active material consisting of lead oxide as the principal component and at least one member selected from the group consisting of bismuth, bismuth compounds, thallium and thallium compounds as an additive, negative electrodes, the positive electrodes and negative electrodes being alternately arranged with separators therebetween in the battery container, and dilute sulfuric acid filling the inner space of the battery container, wherein the amount of bismuth or a bismuth compound is in the range of 0.001 to 0.03 wt % of the active material, expressed as net bismuth, the amount of thallium or thallium compound is up to 0.1 wt % of the active material, expressed as net thallium and the amount of both bismuth or a bismuth compound and thallium or a thallium compound is in the range of 0.001 to 0.03 wt % of the active material, expressed as net elements, the additive being incorporated in the lead oxide by preparing a bulk lead alloy which includes the additive, and pulverizing the alloy, or by mixing a solution of a lead compound with a solution of the additive, and neutralizing the mixture of solutions to form precipitates.

12. A lead-accumulator as set forth in claim 11 wherein the active material deposited on the positive electrodes contains thallium, thallium (I) oxide, thallium (III) oxide or thallium sulfate as additive and the amount thereof falls in the range of 0.005 to 0.05 wt%, expressed as net thallium.

13. A lead-accumulator as set forth in claim 11 wherein the active material contains bismuth or a bismuth compound as additive and the amount thereof is in the range of 0.001 to 0.03 wt%, expressed as net bismuth.

14. A lead-accumulator as set forth in claim 13, wherein the active material is in the range of 0.005 to 0.02 wt %.

15. A lead-accumulator as set forth in claim 11 in which the active material contains both thallium or a thallium compound and bismuth or a bismuth compound and the amount of these components in the active material is in the range of 0.001 to 0.03 wt%, expressed as net thallium and net bismuth.

16. A lead-accumulator as set forth in claim 15 wherein the active material is in the range of 0.005 to 0.2 wt %.

17. A lead-accumulator as set forth in claim 16, wherein the ratio Bi/Tl is approximately 1:1.

* * * * *